United States Patent

[11] 3,615,184

| [72] | Inventors | Oskar Gehrig;<br>Theodor Riehm, both of Mannheim,<br>Germany |
|---|---|---|
| [21] | Appl. No. | 694,700 |
| [22] | Filed | Dec. 29, 1967 |
| [45] | Patented | Oct. 26, 1971 |
| [73] | Assignee | Joh. A. Benckiser GmbH, Chemische Fabrik<br>Ludwigshafen, Germany |
| [32] | Priority | Dec. 30, 1966 |
| [33] | | Germany |
| [31] | | B 90523 |

[54] PROCESS OF PRODUCING ALKALI METAL ORTHOPHOSPHATES
8 Claims, 1 Drawing Fig.

[52] U.S. Cl. ..................................................... 23/107, 159/47
[51] Int. Cl. ........................................................ C01b 25/30
[50] Field of Search ............................................ 23/107, 106, 106 A; 71/43

[56] References Cited
UNITED STATES PATENTS

| 3,201,195 | 8/1965 | Huber et al. | 23/107 |
| 3,261,392 | 7/1966 | Jacoby | 159/27 |
| 3,362,457 | 1/1968 | Chirico | 159/17 |
| 1,689,547 | 10/1928 | Carothers | 23/107 |
| 1,936,168 | 1/1933 | Larsson | 23/107 |
| 2,390,400 | 12/1945 | Taylor | 23/107 |
| 3,211,523 | 10/1965 | Meluill | 23/107 |
| 3,409,394 | 11/1968 | Sprigg | 23/109 |
| 3,419,899 | 12/1968 | Tufts et al. | 23/302 |

FOREIGN PATENTS

| 554,670 | 2/1957 | Belgium | 23/107 |

Primary Examiner—Oscar R. Vertiz
Assistant Examiner—Gregory A. Heller
Attorneys—Erich M. H. Radde, Charles A. McClure, Gerard J. Weiser and Alfred Stapler ABSTRACT: Alkali metal salts of orthophosphoric acid are obtained by continuously reacting the required amounts of concentrated phosphoric acid with 40 percent to 65 percent of phosphorus pentoxide, with a 40 percent to 70 percent alkali metal hydroxide solution in a flash reactor, continuously passing the resulting reaction product through a single-effect or a multiple-effect evaporator which may be under vacuum to concentrate the same, thereby utilizing the steam set free in the reactor and, if multiple-effect evaporators are used, the steam generated in each preceding evaporator to heat the following evaporator, and separating the crystals from the mother liquor which may be recirculated into the reactor and/or the evaporators. Proceeding in this manner permits one to produce crystalline alkali metal orthophosphates in substantially dry form without additional supply of heat energy.

The apparatus assembly for carrying out this improved process consists of a flash reactor with stirring device, a single-effect evaporator or a multiple-effect evaporator connected in series with the reactor, a device for separating crystals from liquid such as a centrifuge, and a vacuum device. Pipes connecting the evaporators with, and conducting the condensed steam therefrom to, heat exchangers for preheating the reaction components may be provided, likewise pipes connecting the liquid discharge of the separating device with the reactor and/or the evaporators.

Examples of alkali metal orthophosphates obtained by the process and apparatus of this invention are monosodium and monopotassium orthophosphates, disodium orthophosphates with and without water of crystallization, trisodium orthophosphate.

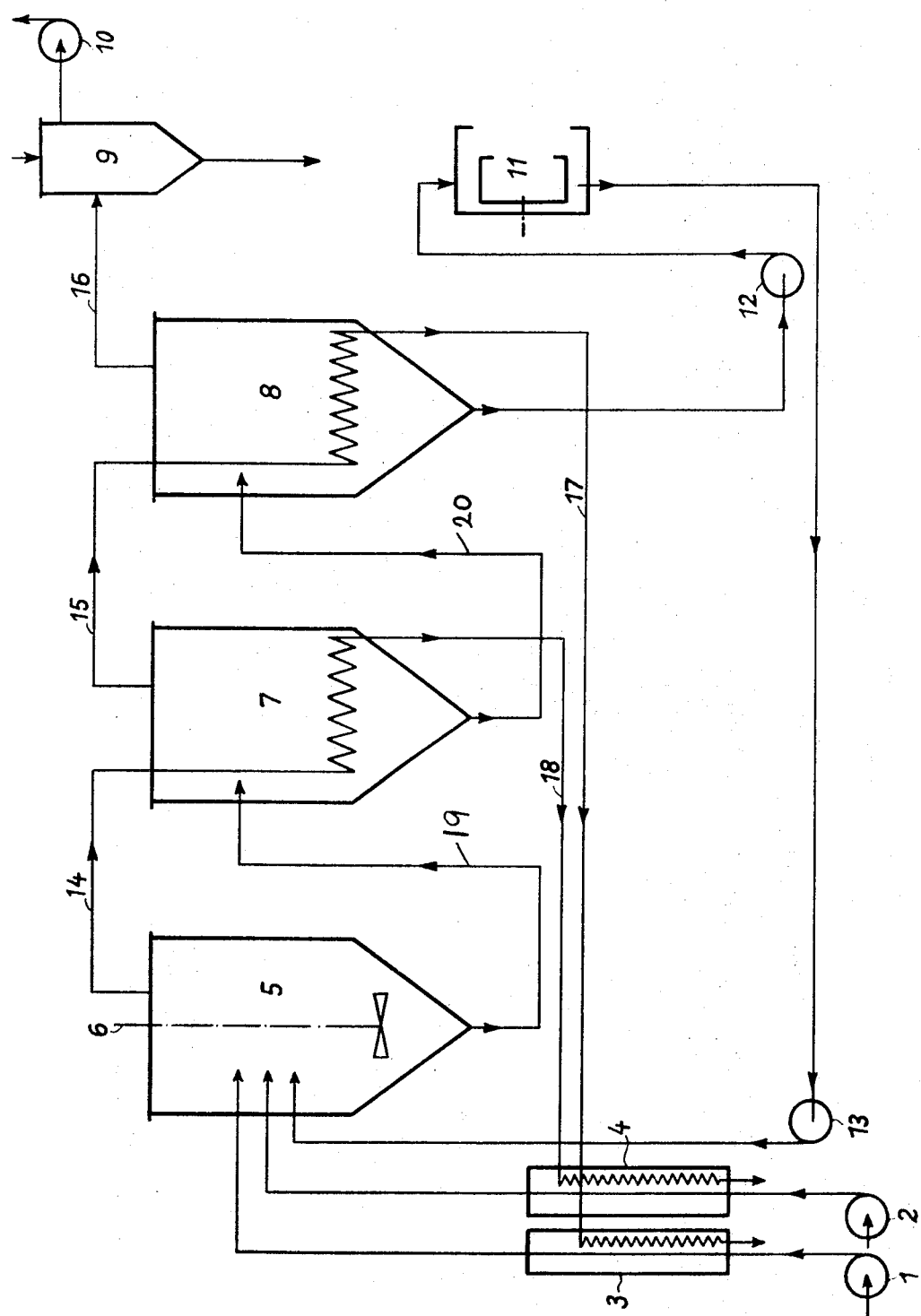

PROCESS OF PRODUCING ALKALI METAL ORTHOPHOSPHATES

BACKGROUND OF THE INVENTION

The present invention relates to an improved progress of producing alkali metal orthophosphates and more particularly to a process of producing such alkali metal orthophosphates from phosphoric acid and alkali metal hydroxide solutions by using evaporators, and to an apparatus assembly used in carrying out said process.

Neutralization, for instance, of phosphoric acid with sodium hydroxide solution to produce the corresponding salts is conventionally effected by mixing the alkali metal hydroxide solution and the acid in the presence of water in batch operation in reaction vessels provided with stirring devices while cooling. Thereafter, the reaction mixture is filtered, if necessary, and is then evaporated to dryness in batches or continuously by single-effect or multiple-effect evaporation until the salts crystallize.

According to another known press the neutralized phosphoric acid solution is concentrated by evaporation to the saturation limit which is then allowed to crystallize in crystallization pans while cooling. The resulting crystals are separated from the mother liquor by centrifuging or by filtration. All these processes require supply of additional heat energy to concentrate the neutralized phosphoric acid solution.

SUMMARY OF THE INVENTION

It is one object of the present invention to provide a simple and effective process of producing alkali metal orthophosphates without any additional heat supply.

Another object of the present invention is to provide a simple and highly effective arrangement of apparatus for carrying out the process of producing alkali metal orthophosphates without additional heat supply.

Other objects of the present invention and advantageous features thereof will become apparent as the description proceeds.

In principle the process according to the present invention comprises the following steps:

a. Concentrated phosphoric acid of a $P_2O_5$-content of at least 40 percent and preferably between about 50 percent and about 65 percent is continuously reacted with about 40 percent to about 70 percent and preferably with 50 percent alkali metal hydroxide solution in a flash reaction chamber, i.e. a vessel wherein the reaction water vapor is allowed to expand rapidly. The concentrated phosphoric acid solution used may be produced thermally as well as by the wet process. Thermally prepared phosphoric acid is the preferred starting material.

b. The resulting reaction product is then continuously conducted through one or several evaporators or vacuum evaporators which are heated by the water vapor set free in the flash neutralization chamber.

c. The resulting crystallized produce is separated from the mother liquor by means of conventional separators such as centrifuges, filters, suction filters.

d. If desired, the mother liquor is returned to the flash reaction chamber and/or into the evaporator or evaporators, for instance, by means of a pump.

When proceeding in this manner, it is not necessary to supply additional heat energy. Thus the process according to this invention is highly economical and superior to the known processes of producing substantially dry, crystalline alkali metal orthophosphates, such as monosodium phosphate, $NaH_2PO_4$, disodium phosphate $Na_2HPO_4 \cdot 2H_2O$, trisodium phosphate $Na_3PO_4$, monopotassium phosphate $KH_2PO_4$, and others.

Whether one or several evaporators are provided, is dependent on the amount of mother liquor present in the final evaporation stage, i.e. to what extent the amount of mother liquor in the salt is to be reduced or even completely eliminated. In general it has been found that when starting with a predetermined concentration of phosphoric acid and alkali metal hydroxide solution, the production of the monoalkali metal phosphates requires a larger number of evaporators than the production of the di- or trialkali metal phosphates.

The number of evaporators is also dependent on the the concentration of the starting phosphoric acid and alkali metal hydroxide solution. For instance, the production of monoalkali metal phosphates requires several evaporators if the concentration of the starting phosphoric acid and alakali metal hydroxide solution is of the above-mentioned lowest value, for instance, if phosphoric acid of 40 percent $P_2O_5$ and 40 percent alkali metal hydroxide solution are used and if the entire mother liquor is to be recirculated into the flash reactor.

The condensed water vapor recovered after leaving the last evaporator may also be utilized for preheating the starting phosphoric acid and alkali metal hydroxide solution.

If the reaction solution is evaporated to dryness, i.e. so that the entire water is evaporated, it is necessary to charge the flash reactor initially with a saturated solution of the phosphate to be produced. Said saturated salt solution serves as circulating mother liquor to carry the phosphate through the evaporators.

BRIEF DESCRIPTION OF THE DRAWING

The process according to the present invention is preferably carried out in an assembly of apparatus as illustrated in the attached drawing in which Fig. 1 is a schematic cross-sectional view showing the reaction vessel and two evaporators, connecting pipes, pumps, heat exchangers, the centrifuge, and the like.

In said FIG. 1 metering or proportioning pumps 1 and 2 continuously pump the concentrated alkali metal hydroxide solution and the phosphoric acid in the proportion as required for the desired final product through heat exchangers 3 and 4 into flash reactor 5 provided with stirring device 6. The phosphoric acid and the alkali metal hydroxide solution are mixed and reacted with each other in said reactor 5. Thereby, water vapor is generated and is conducted through pipe 14 to evaporator 7. The water vapor generated in evaporator 7, in turn, is conducted through pipe 15 into evaporator 8. The reaction solution is successively passed through pipes 19 and 20 into evaporators 7 and 8 and is concentrated therein to the desired concentration. Pump 12 withdraws the concentrated phosphate slurry from evaporator 8 and forwards it to centrifuge 11. Centrifuge 11 separates the phosphates crystals from the motor liquor. The residual mother liquor is returned by means of pump 13 from centrifuge 11 to flash reactor 5 or, if desired, to one of the evaporators 7 or 8.

The condensed water vapor may be recirculated from evaporators 7 or 8 through pipes 17 or 18 into heat exchangers 3 and 4 and is advantageously utilized to heat the starting phosphoric acid and alkali metal hydroxide solution to the desired reaction temperature.

Evaporator 8 is connected by pipe 16 with condenser 9 and vacuum pump 10.

Of course, only one evaporator or more than two evaporators may be provided and concentration of the reaction solution may also be carried out under atmospheric, superatmospheric or subpressure conditions.

DESCRIPTION OF THE PREFERRED EMBODIMENTS

The following examples serve to illustrate the present invention without, however, limiting the same thereto.

EXAMPLE 1

Production of disodium orthophosphate $Na_2HPO_4 \cdot 2H_2O$

Disodium orthophosphate is produced in the apparatus assembly operating with two evaporators 7 and 8 following the flash reactor vessel 5 as shown in Fig. 1.

3,450 kg./hour of phosphoric acid with 58 percent $P_2O_5$, corresponding to 2,000 kg./hour of phosphorus pentoxide, and 4,500 kg./hour of 50 percent sodium hydroxide solution, corresponding to 1,740 kg./hour of sodium oxide $Na_2O$, are pumped into reactor 5. 1,150 kg./hour of water vapor are generated in said reactor 5 and are utilized to heat evaporator 7. A total of 1,800 kg./hour of water are evaporated in evaporators 7 and 8. 6,580 kg./hour of mother liquor discharged from centrifuge 11 are pumped and recirculated into reactor 5. When starting operation, 6,580 kg./hour saturated disodium phosphate solution is introduced into reactor 5 in place of the mother liquor. The total content of evaporator 8 consisting of crystals and mother liquor is discharged and pumped to centrifuge 11. 5,000 kg./hour of disodium orthophosphate $Na_2HPO_4 \cdot 2H_2O$ are thus freed of mother liquor by centrifuging. When proceeding in this manner, it is possible to evaporate from the aqueous phosphoric acid and the aqueous sodium hydroxide solution all the water used for dissolving the reactants without further heat supply so that the disodium phosphate is obtained in dry crystalline form.

Reactor 5 has a capacity of 1 cu.m., evaporator 7 a capacity of 10 cu.m., and evaporator 8 a capacity of 10 cu.m. Vacuum pump 10 produces a vacuum of 118 mm.Hg. The temperature of the reaction mixture in reactor 5 is between 105° C. and 115° C., the temperature in evaporator 7 between 80° C. and 90° C., and the temperature in evaporator 8 between 60° C. and 65° C. The temperature of the crystalline slurry discharged from evaporator 8 is between 62° C. and 67° C.

EXAMPLE 2

Production of monosodium orthophosphate $NaH_2PO_4$

When producing monosodium orthophosphate, three evaporators 7, 8, and 8a (not shown) are provided following reactor 5. 1,840 kg./hour of phosphoric acid with 58 percent $P_2O_5$, corresponding to 1,065 kg./hour of phosphorus pentoxide, and 1,200 kg. of 50 percent sodium hydroxide solution, corresponding to 465 kg./hour of sodium oxide $Na_2O$, are pumped into reactor 5. Thereby, 320 kg./hour of water vapor are generated and are used for heating evaporator 7. A total of 920 kg./hour of water evaporate in evaporators 7, 8, and 8a following reactor 5. The slurry of crystalline reaction product and mother liquor is discharged from the last evaporator 8a and is pumped to centrifuge 11. 1,800 kg./hour of monosodium orthophosphate are recovered in crystalline form on centrifuging. 2,330 kg./hour of mother liquor are pumped and recirculated into the second evaporator 8. When starting operation, 2,330 kg./hour saturated monosodium phosphate solution is added to the second evaporator 8 in place of the mother liquor from the centrifuge. The heating surfaces of the evaporators comprising approx. 12 square m. are dimensioned so that the temperature decreases substantially uniformly from evaporator 7 through evaporator 8 to evaporator 8a. The temperature of the steam escaping from reactor 5 is about 120° C., that in the first evaporator 7 about 105° C., that in the second evaporator 8 about 85° C., and that in the last evaporator 8a about 65° C.

Reactor 5 has a capacity of 1 cu.m., evaporator 7 a capacity of 10 cu.m., evaporator 8 a capacity of 10 cu.m., and evaporator 8a a capacity of 10 cu.m. Vacuum pump 10 produces a vacuum of 118 mm.Hg. Proceeding as described hereinabove also permits to evaporate all the water of solution without any additional heat supply so that pure, crystalline monosodium orthophosphate is obtained.

EXAMPLE 3

Production of trisodium orthophosphate $Na_3PO_4 \cdot \frac{1}{2}H_2O$

The process requires two evaporators 7 and 8 as shown in FIG. 1. The procedure is the same as described in example 1. 123 kg./hour of phosphoric acid of 58 percent $P_2O_5$, corresponding to 71 kg./hour of phosphorus pentoxide, and 240 kg./hour of 50 percent sodium hydroxide solution, corresponding to 93 kg./hour of sodium oxide $Na_2O$, are pumped into reactor 5. Thereby 70 kg./hour of water evaporate. The resulting steam is used for heating the first evaporator 7. The steam generated thereby is used to heat the second evaporator 8, whereby in both evaporators 7 and 8 120 kg./hour of water evaporate. At the same time 250 kg./hour of mother liquor are pumped into flash reactor 5. Finally 173 kg./hour of trisodium orthophosphate $\cdot \frac{1}{2}H_2O$ with 40 $P_2O_5$ are recovered from the evaporation residue discharged from evaporator 8. The entire mother liquor is recycled into reactor 5. The process yields a completely dry phosphate without requiring any additional heat supply.

EXAMPLE 4

Production of monopotassium orthophosphate $KH_2PO_4$

To produce monopotassium orthophosphate requires three evaporators 7, 8, and 8a (not shown) arranged in series following flash reactor 5 as described in example 2. 1,540 kg./hour of phosphoric acid with 65 percent $P_2O_5$, corresponding to 1,000 kg./hour phosphorus pentoxide, and 1,580 kg./hour of 50 percent potassium hydroxide solution, corresponding to 663 kg./hour of potassium oxide $K_2O$, are pumped into flash reactor 5. Thereby, 310 kg./hour of water vapor are generated and are used for heating evaporator 7. In the three evaporators 7, 8, and 8a there evaporate all in all 890 kg./hour of water. 2,500 kg./hour of mother liquor are continuously recirculated from the centrifuge into the first evaporator 7. When starting operation, 2,500 kg./hour saturated monopotassium orthophosphate solution is introduced into the first evaporator 7 in place of the mother liquor. The resulting crystalline slurry is discharged from the last evaporator 8a and pumped into centrifuge 11, which operates continuously. 1,915 kg./hour of monopotassium orthophosphate are recovered by centrifuging. The heating surfaces of the evaporators comprising 12 square m. are dimensioned so that the temperature decreases substantially uniformly from evaporator 7 through evaporator 8 to evaporator 8a. The temperature of the steam escaping from reactor 5 is about 120° C., that in the first evaporator 7 about 105° C., that in the second evaporator about 85° C., and that in the last evaporator 8a about 65° C.

Reactor 5 has a capacity of 1 cu.m., evaporator 7 a capacity of 10 cu.m., evaporator 8 a capacity of 10 cu.m., and evaporator 8a a capacity of 10 cu.m. Vacuum pump 10 produces a vacuum of 115 mm.Hg.

Proceeding as described hereinabove also permits to evaporate all the water of solution without any additional heat supply so that pure crystalline anhydrous monopotassium orthophosphate is obtained.

EXAMPLE 5

Production of disodium orthophosphate $Na_2HPO_4 \cdot 2H_2O$

The process requires two evaporators 7 and 8 as shown in Fig. 1. The procedure is the same as described in example 1. 5,000 kg./hour of phosphoric acid with 40 percent $P_2O_5$, corresponding to 2,000 kg./hour of phosphorus pentoxide, and 3,260 kg./hour of 69 percent sodium hydroxide solution, corresponding to 1,740 kg./hour of sodium oxide $Na_2O$, are pumped into reactor 5. Therein, 1,150 kg./hour of steam are generated which are used for heating evaporator 7. A further total amount of 2,110 kg./hour of water are evaporated in the two evaporators 7 and 8. 6,580 kg./hour of mother liquor are continuously pumped from centrifuge 11 into reactor 5. When starting operation, 6,580 kg./hour saturated disodium orthophosphate solution is introduced into reactor 5 in place of mother liquor. The total contents of evaporator 8 consisting of crystals suspended in mother liquor are discharged and pumped into centrifuge 11. 5,000 kg./hour of disodium orthophosphate $Na_2HPO_4 \cdot 2H_2O$ are recovered by centrifuging.

REactor 5 has a capacity of 1 cu.m., evaporator 7 a capacity of 10 cu.m., and evaporator 8 a capacity of 10 cu.m. Vacuum pump 10 produces a vacuum of 108 mm.Hg. The temperature of the reaction mixture in reactor 5 is between 105° C. and 115° C., and the temperature in evaporator 7 between 80° C. and 90° C., and the temperature in evaporator 8 between 60°

C. and 65° C. The temperature of the crystalline slurry discharged from evaporator 8 is between 62° C. and 67° C.

EXAMPLE 6

Production of anhydrous disodium orthophosphate $Na_2HPO_4$

To produce anhydrous disodium orthophosphate requires only one evaporator 7 provided after flash neutralizer 5. 3,080 kg./hour of phosphoric acid with 65 percent $P_2O_5$, corresponding to 2,000 kg./hour of phosphorus pentoxide, and 4,500 kg./hour of 50 percent sodium hydroxide solution, corresponding to 1,740 kg./hour of sodium oxide $Na_2O$, are pumped into reactor 5. 1,100 kg./hour of steam are generated therein. The temperature of the steam escaping from reactor 5 is about 150° C. A further amount of 1,060 kg./hour of water are evaporated at a temperature of 110° C. in evaporator 7. The entire contents of evaporator 7 consisting of crystals suspended in mother liquor are continuously pumped into centrifuge 11. 2520 kg./hour of anhydrous disodium orthophosphate are recovered. In addition 2,900 kg./hour of mother liquor are separated by centrifuging. Said mother liquor may be further processed to a produce containing water of crystallization.

Reactor 5 has a capacity of 1 cu.m. and evaporator 7 a capacity of 10 cu.m. The temperature of the crystalline slurry discharged from evaporator 7 is between 110° C. and 115° C.

Of course, many changes and variations in the concentration of the starting phosphoric acid and alkali metal hydroxide solution, in the amount of mother liquor recirculated into the reactor and/or the evaporators, in the reaction and evaporation conditions, temperature, and pressure, in the apparatus used for carrying out the invention, and the like may be made in accordance with the principles set forth herein and in the claims annexed hereto.

We claim:

1. In a process of producing alkali metal orthophosphates by neutralizing phosphoric acid and alkali metal hydroxide solution, concentrating the resulting alkali metal phosphate solution by evaporation, continuously discharging the resulting concentrated slurry of alkali metal phosphate crystals from the evaporating space, and continuously separating the alkali metal phosphate crystals from the mother liquor, the improvement which comprises the steps of
    a. continuously reacting in a flash reaction space concentrated phosphoric acid of a phosphorus pentoxide content between about 40 percent and about 65 percent
    b. with an alkali metal hydroxide solution containing about 40 percent and about 70 percent of alkali metal hydroxide while stirring, whereby steam is generated,
    c. said phosphoric acid and alkali metal hydroxide solution being supplied in the proportion required to yield the desired alkali metal orthophosphate, and
    d. continuously conducting the resulting alkali metal phosphate solution into at least one evaporating space and concentrating said solution therein
    e. by indirectly heating said evaporating space by the steam generated on reaction of the phosphoric acid and the alkali metal hydroxide solution and conducted into said evaporating space.

2. The process according to claim 1, wherein a sodium hydroxide solution containing between about 40 percent and about 70 percent of sodium hydroxide is used in step (b) for reaction with the phosphoric acid.

3. The process according to claim 1, wherein an about 50 percent sodium hydroxide solution is used in step (b) for reaction with the phosphoric acid.

4. The process according to claim 1, wherein concentrated phosphoric acid with a phosphorus pentoxide content of about 58 percent is used in step (a) for reaction with the alkali metal hydroxide solution.

5. The process according to claim 1, wherein concentrated phosphoric acid with a phosphorus pentoxide content of about 58 percent is used in steps (a and b) for reacting with an about 50 percent sodium hydroxide solution.

6. The according to claim 1, wherein step (d) the resulting alkali metal phosphate solution is conducted into a first evaporating space to cause preconcentration and wherein the preconcentrated alkali metal phosphate solution is conducted from said first evaporating space into a second evaporating space to cause final concentration, and whereby in step (d) the first evaporating space is heated by the steam generated on reaction of the phosphoric acid with the alkali metal hydroxide solution while the second evaporating space is heated by the stem evolved in said first evaporating space.

7. The process according to claim 1, wherein steps (d and e) the alkali metal phosphate solution is concentrated in a vacuum.

8. The process according to claim 1, wherein in addition step (d) the steam condensed in at least one of the evaporating spaces is conducted to a heat exchanging space to cause preheating of the phosphoric acid and the alkali metal hydroxide solution before reaction in step (a).

* * * * *

PO-1050
(5/69)

UNITED STATES PATENT OFFICE
CERTIFICATE OF CORRECTION

Patent No. 3,615,184  Dated October 26, 1971

Inventor(s) OSKAR GEHRIG and THEODOR RIEHM

It is certified that error appears in the above-identified patent and that said Letters Patent are hereby corrected as shown below:

Column 1, line 5: "progress" should read -- process --; column 1, line 21: "press" should read -- process --; column 1, line 58: "produce" should read -- product --; column 2, line 6: "the", second occurrence, should be cancelled; column 2, line 10: "alakali" should read -- alkali --; column 2, line 48: "motor" should read -- mother --; column 4, line 4: After "40" insert -- percent --; column 4, line 70: "REactor" should read -- Reactor --; column 5, line 23: "produce" should read -- product --; column 6, line 29: After "The" insert -- process --; column 6, line 29: Before "step" insert -- in --; column 6, line 38: "stem" should read -- steam --; column 6, line 39: Before "steps" insert -- in --; column 6, line 42: "addition" should read -- additional --.

Signed and sealed this 18th day of April 1972.

(SEAL)
Attest:

EDWARD M. FLETCHER, JR.
Attesting Officer

ROBERT GOTTSCHALK
Commissioner of Patents